Dec. 17, 1929. M. B. LUCKER Re. 17,527

DOUBLE LIFT JACK

Original Filed July 20, 1925

Inventor:
Millard B. Lucker,
By Cheever & Cox Attys

Reissued Dec. 17, 1929 Re. 17,527

UNITED STATES PATENT OFFICE

MILLARD B. LUCKER, OF BENTON HARBOR, MICHIGAN, ASSIGNOR TO AUTO SPECIALTIES MANUFACTURING COMPANY, OF SAN FRANCISCO, CALIFORNIA, A CORPORATION OF CALIFORNIA

DOUBLE-LIFT JACK

Original No. 1,593,217, dated July 20, 1926, Serial No. 44,818, filed July 20, 1925. Application for reissue filed May 16, 1928. Serial No. 278,261.

This invention relates to lifting jacks for heavy loads and particularly to those of the double lift type which can be collapsed into an extremely small compass for transportation and storage in an automobile or the like.

Among the important objects of my present invention is the provision of a lifting jack having a novel construction whereby the ratio of collapsed height to fully extended height has a minimum value, whereby the lifting members of the jack are completely enclosed both in the extended and collapsed jack positions and whereby, when in collapsed position, the jack parts nest within each other to an extent not heretofore provided in jack constructions of this general nature.

Numerous attendant advantages of the improved construction of my invention will be apparent as it is more fully understood from the following description which, taken in connection with the accompanying drawings, discloses a preferred embodiment of the invention.

Figure 1:
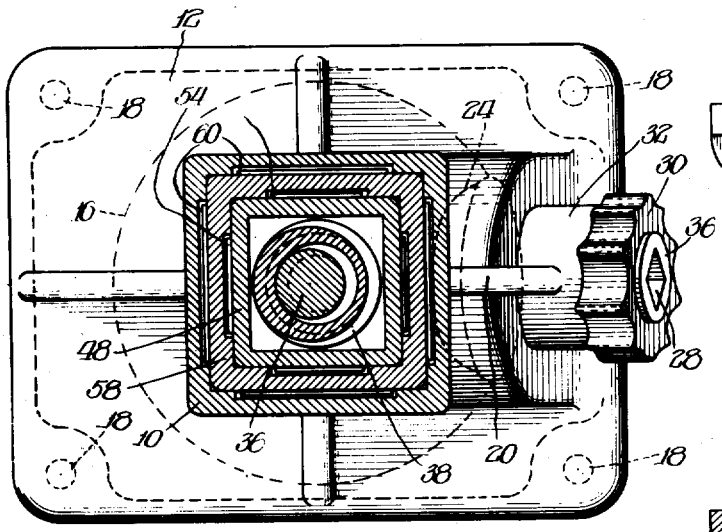
Figure 3:
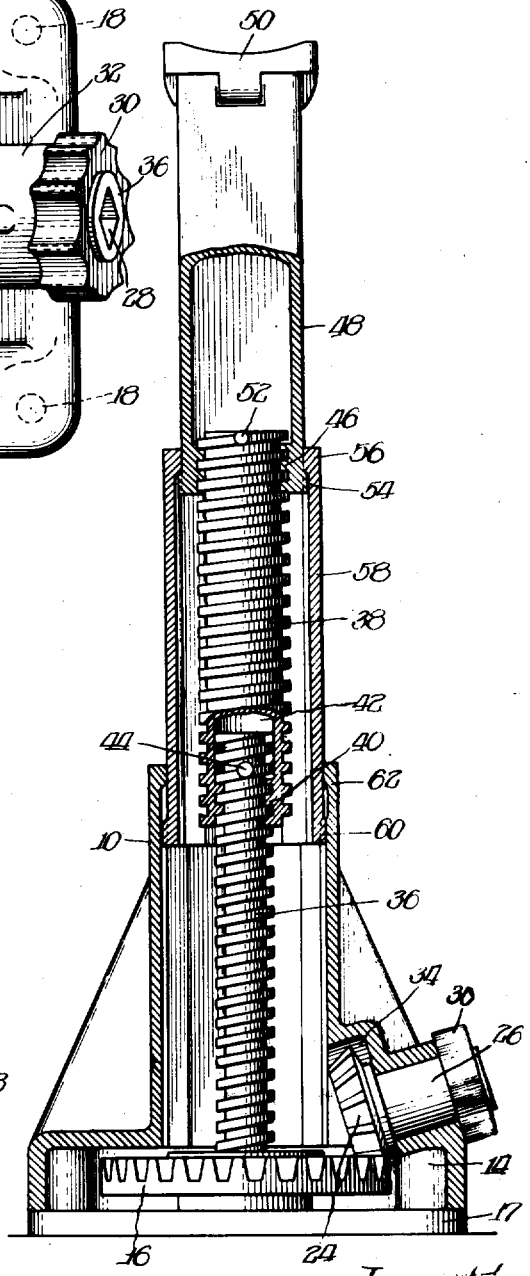
Figure 2:
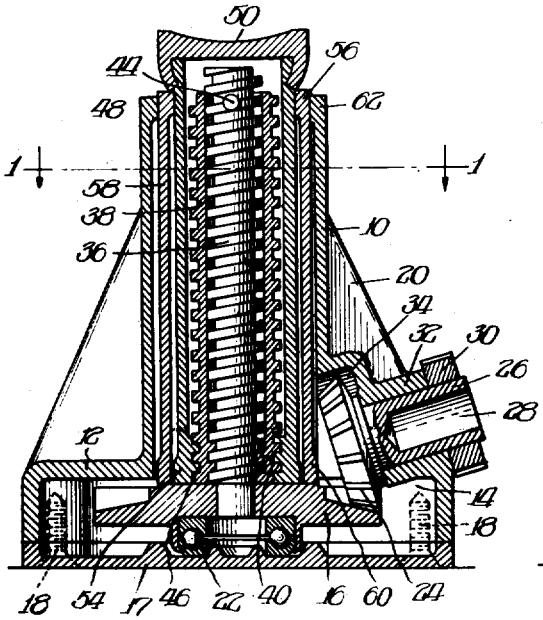

Figure 1 is a plan view taken in section on the line 1—1 of Figure 2; Figure 2 is a central, sectional side elevation of the mechanism of Figure 1, showing the parts in collapsed position; and Figure 3 is a view similar to Figure 2, showing the jack extended to its maximum load carrying capacity.

To illustrate my invention I have shown on the drawings, a retaining base comprising an upstanding, hollow portion 10 open at the top and communicating at the bottom with a horizontal case member 12, having a recess 14 in which a main driving gear 16 is housed. The gear housing 14 is closed by a bottom plate 17 detachably secured in place as shown by any suitable means as, for instance, the screws 18. The base portions 10 and 12 are braced at four points by cast webs 20 of conventional form with the result that the case as a whole is amply able to withstand all load strains which may be imposed upon it.

Horizontal gear 16, heretofore referred to, is journaled in chamber 14 on bottom plate 17 by any conventional form of anti-friction mechanism, specifically ball-bearing devices ball-bearing devices 22 of Figure 2 of the drawings. Beveled gear 16 is driven by a beveled pinion 24 intermeshing with it, so placed that its hub 26 extends outside the base at a convenient angle to be engaged by a suitable driving instrument. The driving instrument may be either a long auger-like handle, having its lower, non-circular end fittable into a non-circular socket 28 in the shaft 26, or it may be a suitable tool applied to irregular surfaced wheel or gear 30, rigidly secured to the outside of shaft 26. Shaft 26 is journaled in a suitable bearing 32 formed in the exterior of the case. Pinion 24 rotates in a recessed chamber 34, provided for it at one side of the base, and in communication with chamber 14, heretofore described, all as clearly appears in Figure 2.

Horizontal gear 16 is rigidly secured by any suitable means, not detailed in the drawings, to a short, comparatively small lifting screw 36. Fitting over screw 36 and in screw threaded engagement therewith is a second, larger screw 38, screw threaded inside and out. The internal threads 40 formed upon the lower end of screw member 38 extend only a short distance into the interior chamber 42 of said screw member. Screw 36 is provided with a transverse pin 44 above the screw threads 40 of screw member 38 which engages the tops of the screw threads 40 if the screw 38 is moved any higher than shown in the position of Figure 3, with the result that rotation of screw 36 cannot drive large screw member 38 off from the top of said screw member 36.

In similar manner, the external screw threads of screw member 38 operatively engage internal screw threads 46 extending for a short distance into the lower end of the upper rectangular slide or load engaging member 48 of the jack which latter terminates at its upper end in the load engaging block 50 of conventional form, and similarly, the upper end of screw 38 is equipped with a transverse, horizontal pin 52 which engages the upper end of load carrying internal screw threads 46 on slide 48 to prevent the slide being accidentally removed from large screw 38.

The lower external surface of load carrying slide 48 is equipped with a protruding flange 54 which is in turn engageable with an internal flange on an intermediate hollow slide member 58, said latter member being slidably engaged in the upstanding portion 10 of the base. In similar manner, the lower end of the slide member 58 has an external flange 60 engageable with an internal flange 62 on the upper end of the upstanding portion 10 of the base.

The result of the construction described is that engagement of flanges 60 and 62 prevents slide 58 being lifted upwardly out of case 10, and the engagement of flanges 54 and 56 prevents the lifting of upper slide 48 out of intermediate slide 58. During the extension of the second extensible member 48 to the fully raised position illustrated in Figure 3, the enclosing sleeve 58 will be lifted by the upward movement of the second extensible member 48. This lifting operation may be accomplished either through the frictional engagement of the lug 56 with the side walls of the second extensible member 48 or through the positive interlocking connection of the lugs 56 of the sleeve and the co-operating and corresponding lugs 54 at the base of the second lifting member.

It may be explained at this point that when it is necessary to separate the parts 10—58 and 48, it is accomplished by first removing the plate 17 and then withdrawing the entire lifting mechanism out through the bottom of the case mechanism in quite obvious manner.

In the operation of the jack, assume the parts are in the position of Figure 2 and that the operating tool for rotating shaft 26 has been applied. Rotation of this shaft in the proper direction, depending on the character of the threads of the jack, results first in the movement of the smaller or inside screw 36—this because it is rigidly attached to gear 16 which is in mesh with pinion 24, rigid on shaft 26. As this screw 36 turns, it forces interfitting screw threads 40 on large screw 38 to travel up screw 36 until such time as the upper ends of the screw threads engage pin 44. When this engagement takes place and screw 36 is further rotated, it carries large screw 38 with it thereby necessarily rotating that screw and thus forcing screw threads 46 on upper slide 48 to travel up the outside threads of screw 38. This movement takes place until the threads on the inside of upper slide 48 encounter pin 52 whereupon further movement is prevented and the jack has reached its maximum vertical position. Rotating shaft 26 and pinion 24 in the opposite direction from that which was used in elevating the jack, results in the return of the parts from fully extended position of Figure 3 to contracted position of Figure 2.

Attention is called to the fact that the entire load is carried upon the screws and not by the vertically disposed case member 10 and the intermediate slide 58, thereby insuring free, easy operation of the device.

In actual practice, the mechanism has been found most efficient and satisfactory, displacing numerous prior devices heretofore in the market.

The use of the non-circular, specifically rectangular members 48—58 and 10 telescopically interfitting has advantages particularly when the jack is without load on the member 50. However, any cross sectional parts excluding circle may be used without departing from the broad principle of the invention.

The members 44 and 52 are described as "pins" and may be, obviously, protruding members of other character as, for instance, welded stops, without departing from the invention.

Having thus described my invention, what I claim as new and desire to secure by Letters Patent is:

1. In a lifting jack having a support frame, the combination of a driving member mounted in the frame, driving means formed at one end of the driving member and extending outwardly thereof, a lifting member having telescopic relationship and threaded connection with the driving member, and a second lifting member having telescopic relationship with the first lifting member, said driving member and said lifting members having screw threaded interconnection and arranged so that said second lifting member encloses the first lifting member, resting at one end upon said means, when the jack is in collapsed position and means for preventing rotation of the second lifting member during its longitudinal movement.

2. In a lifting jack having a supporting frame, the combination of a driving member mounted in the frame, a lifting member having threaded driving connection and telescopic relationship with the driving member, and a second lifting member having threaded driving connection and telescopic relationship with the first lifting member, said driving member and said lifting members arranged so that the driving member and first lifting member telescope entirely into the second lifting member and the inner ends of the first and second lifting members are in the same plane when the jack is collapsed, and means for preventing rotation of the second lifting member during its longitudinal movement.

3. In a lifting jack having a support frame, the combination of a driving member mounted in the frame, means formed and arranged at one end of the driving member and extending outwardly thereof for moving the same, a lifting member having telescopic relationship with the driving member, and a second lifting member having telescopic relationship with the first lifting member, said driving member and said lifting members having screw threaded interconnection and arranged so that the second lifting member entirely encloses the driving member and rests at one end upon the said means when the jack is in collapsed position and means for preventing rotation of the second lifting member during its longitudinal movement.

4. In a lifting jack having a support frame, the combination of a driving member mounted in the frame, a lifting member having telescopic relationship with the driving member, and a second lifting member having telescopic relationship with the first lifting member, said driving member and said lifting members having screw threaded interconnection and arranged so that the driving member and the first lifting member telescope entirely within the zone of the second lifting member and the inner ends of the first and second lifting members are in the same plane when the jack is in collapsed position and means for preventing rotation of the second lifting member during its longitudinal movement.

5. In a lifting jack having a support frame, the combination of a driving member mounted in the frame, a lifting member having telescopic relationship with the driving member, and a second lifting member having telescopic relationship with the first lifting member, said driving member and said lifting members having screw threaded interconnection and arranged so that the first lifting member telescopes entirely within the zone of the second lifting member and the inner ends of the first and second lifting members are in the same plane when the jack is in collapsed position and means for preventing rotation of the second lifting member during its longitudinal movement.

6. In a lifting jack having a supporting frame, the combination of a driving member mounted in the frame, a first lifting member having threaded driving engagement and telescopic relationship with the driving member, and a second lifting member having threaded driving engagement and telescopic relationship with the first lifting member, and a sleeve having direct connection solely with the housing and the second lifting member for preventing rotation and limiting the projection of the second lifting member.

7. In a lifting jack having a support frame, the combination of a driving member mounted in the frame, means for driving said member, a lifting member having threaded driving engagement and telescopic relationship with the driving member, and a second lifting member having threaded driving engagement and telescopic relationship with the first lifting member, said driving member and said lifting members being arranged so that said second lifting member substantially encloses the driving member when the jack is in collapsed position, said frame having a tubular portion for enclosing said members when the jack is in relatively collapsed position, and a member cooperating solely between said second lifting member and the frame to enclose said first lifting member when the jack is in extended position and means for preventing rotation of the second lifting member during its longitudinal movement.

8. In a lifting jack having a support frame, the combination of a driving member mounted in the frame, a lifting member having telescopic relationship with the driving member, and a second lifting member having telescopic relationship with the first lifting member, said first lifting member having operative engagement solely with said driving member and with said second lifting member, and a sleeve cooperating between said second lifting member and the frame to enclose said first lifting member when the jack is extended, and to provide a splined connection between the second lifting member and the frame, whereby to prevent relative rotation therebetween, said sleeve being adapted to telescope into the zone of the frame when the jack is in collapsed position.

9. In a lifting jack having a support frame, the combination of a driving member mounted in the frame and having a radially extending portion, means for rotating said driving member, a lifting member and a second lifting member, said driving and lifting members having telescopic relationship and having screw threaded interconnection and said lifting members being arranged to engage the radial portion of the driving member when the jack is fully collapsed and means for holding the second lifting member from rotation with respect to the frame.

10. In a lifting jack having a support frame, the combination of a threaded driving member mounted on the frame and having a radially extending portion, means for rotating said driving member, a lifting member having telescopic relationship and threaded connection with the driving member, and a second lifting member having telescopic relationship and threaded connection with said first lifting member, said first lifting member having engagement solely with the driving member and second lifting member, the lower end of the second lifting member being adapted to lie adjacent the radially extending portion of the driving member when the jack is in collapsed position, and means for holding the second lifting member from rotation with respect to the frame.

11. An extensible screw jack of the double lift type having an upstanding enclosing housing provided with a central opening extending axially of the housing throughout its length, and formed with a longitudinally extending guideway, a horizontal bevel gear rotatably mounted in the base of said housing at the central axis thereof, means carried by the housing and engaging said gear for driving the same, a first screw threaded member having rigid driving connection with said horizontal gear and extending upwardly axially through the central opening of the housing, a second screw member having a threaded portion adapted for driving engagement with the threads of the first screw member and having a separate threaded portion, said second screw member being constructed and arranged to have a telescopic fit with relation to said first screw member, and, when in collapsed position, to rest entirely within the zone of the enclosing housing, a third screw member having a threaded portion adapted to engage with the second mentioned separate threaded portion of the second screw member, said third screw member being constructed and arranged so that, when collapsed, it will lie substantially within the zone of the housing and will entirely enclose the first and second screw members, the lowermost ends of the second and third screw members lying upon the upper face of the horizontal beveled gear, and a sleeve-like member interconnecting the third screw member with the housing, said latter member having a splined connection with the third screw member and a separate splined connection with the housing for slidingly connecting the third screw member and the housing whereby to hold the third screw member from rotating with respect to the housing, said sleeve member forming an enclosing housing for the second screw member when the latter is in extended position and said sleeve-like member resting within the zone of the housing when the jack is in collapsed position.

12. An extensible screw jack of the double lift type having upstanding enclosing housing provided with a central opening extending axially of the housing throughout its length, a bevel gear having a horizontally disposed portion and rotatably mounted in the base of said housing at the central axis thereof, means carried by the housing and engaging said gear for driving the same, a first screw member having rigid driving connection with the horizontal portion of the gear and extending upwardly axially through the central opening of the housing, a second screw member having a threaded portion adapted for driving engagement with threads of the first screw member and having a separate threaded portion, said second screw member being constructed and arranged to telescope with respect to said first screw member and into the housing when in collapsed position, a third screw member having threads adapted to engage the threads of the separate threaded portion of the second member and projectable therefrom, and a sleeve adapted to house said second screw member when in its extended position, said sleeve forming a connection between said third screw member and said housing for preventing turning of said third screw member relative to the housing; said second screw member, said third screw member and said sleeve all telescoping within the housing and with their lower ends lying closely adjacent the horizontal portion of the bevel gear when the jack is in collapsed position.

13. An extensible screw jack of the double lift type having an upstanding enclosing housing provided with a central opening extending axially of the housing throughout its length, a first threaded member mounted in said housing and extending longitudinally thereof, means for rotating said first threaded member while holding it from endwise movement, a second threaded member and a third threaded member mounted within said housing, said second and third threaded members having threaded engagement, and said second and first threaded members having threaded engagement, and said second and third screw members being constructed and arranged to have telescopic relation one with the other and with the housing whereby when in collapsed position all of said members will lie substantially wholly within the housing, and a sleeve having a splined connection with the housing, and adapted to enclose said second screw member when the latter is in extended position, said sleeve having a telescopic relation with respect to said first, second and third screw members and within said housing when the jack is collapsed.

14. A jack comprising a hollow base having a vertical extension open at its top, a plurality of telescoping members projectable and retractable from and into said extension, a screw device mounted within the base for projecting and retracting said members, said device having direct connection solely with the innermost member, cooperating stops on said device and the innermost member, whereby movement of the innermost member after projection to a predetermined point will thereafter project an intermediate member, means for preventing the rotation of said intermediate member with respect to the extension and for limiting the projection of said member with respect to said extension.

15. A jack comprising a frame, a driving member mounted in the frame, a first lifting member having threaded driving engagement and telescopic relationship with the driving member, a second lifting member having threaded driving engagement and telescopic relationship with the first lifting member, and a sleeve for housing the first lifting member when in projected position and for holding the second lifting member from rotation, said second lifting member being adapted to telescope substantially within the zone of said sleeve and said frame when in collapsed position, with the lower end thereof disposed in the plane of the lower end of said sleeve whereby to permit a compact collapsed assembly.

16. An extensible screw jack having a housing, a gear rotatably associated with the housing, means for rotating said gear, said gear having a driving member formed with a threaded portion, a first extensible threaded member and a second extensible threaded member and a sleeve, said first extensible member having operative connection with the threaded portion of the driving member and with the second extensible member, said sleeve having splined connection with said housing and with said second extensible member, and said sleeve being projected longitudinally by said second extensible member.

17. In an extensible screw jack having a housing, the combination of a threaded driving member mounted in the housing, means for rotating said driving member, a first lifting member having telescopic relationship and threaded connection with the driving member, and a second lifting member having telescopic relationship and threaded connection with said first lifting member, said first lifting member having engagement solely with the driving member and the second lifting member, and a sleeve arranged to telescope with the second lifting member and providing splined connection between said second lifting member and the housing, said sleeve forming a housing for the first lifting member when the latter is in outwardly projected position.

18. An extensible screw jack having an upstanding enclosing housing provided with a central opening, a gear rotatably associated with the housing, means for rotating said gear, said gear having a driving member formed with a threaded portion, a first extensible threaded member and a second extensible threaded member and a sleeve, said first extensible member having operative connection with the threaded portion of the driving member and with the second extensible member, said sleeve having splined connection with said housing and with said second extensible member, said sleeve and second extensible member having associated means whereby said sleeve is projected upwardly by the upward movement of said second extensible member and into position to house said first extensible member when the latter is in projected position.

19. An extensible screw jack having an upstanding enclosing housing provided with a central opening, a gear rotatably associated with the housing, means for rotating said gear, said gear having a driving member formed with a threaded portion, a first extensible threaded member and a second extensible threaded member and a sleeve, said first extensible member having operative connection with the threaded portion of the driving member and with the second extensible member, said sleeve having splined connection with said housing and with said second extensible member, said sleeve having a stop at its lower end adapted to cooperate with said housing for limiting the outward movement of said sleeve.

20. An extensible screw jack having an upstanding enclosing housing provided with a central opening, a gear rotatably associated with the housing, means for rotating said gear, said gear having a driving member formed with a threaded portion, a first extensible threaded member and a second extensible threaded member and a sleeve, said first extensible member having operative connection with the threaded portion of the upstanding driving member and with the second extensible member, said sleeve having splined connection with said housing and with said second extensible member, said sleeve having an inwardly projecting portion adapted to engage a cooperative portion of said second extensible member for causing the upward projection of said sleeve with said second extensible member.

21. An extensible screw jack having a housing, a gear rotatably associated with the housing, means for rotating said gear, said gear having a driving member formed with a threaded portion, a first extensible threaded member and a second extensible threaded member and a sleeve, all telescoping into the housing, said first extensible member having operative connection with the threaded portion of the upstanding driving member and with the second extensible member, said sleeve having splined connection with said housing and with said second extensible member and being projected longitudinally by the second extensible member, said sleeve having means formed and arranged thereon directly to engage the base to limit the extension of the sleeve from the base and having means formed thereon for cooperation with the second extensible member for limiting the projection of the second extensible member from the sleeve.

22. An extensible screw jack having a frame forming an enclosing housing, a threaded driving portion extending longitudinally of the housing, means for driving said portion, a first lifting member having threaded connection with the threaded portion and adapted to telescope into the housing, a second lifting member adapted to telescope over the first lifting member and into the housing, means causing axial movement of said lifting members when said driving portion is driven, said second lifting member having an imperforate exterior wall whereby to exclude the dust and dirt, and a sleeve likewise having an imperforate exterior wall to exclude dust and dirt, said sleeve telescopically enclosing the first and second lifting members and likewise telescoping into the housing, and means whereby said sleeve is projected longitudinally by said second lifting member whereby to cause it to enclose said first lifting member when the latter is in projected position.

23. A jack comprising a hollow base having a vertical extension open at its top, a plurality of threaded telescoping members projectable and retractable from and into said extension, a screw device mounted within the base for projecting and retracting said members, the innermost of said threaded members having connection solely with the screw device and with another of said threaded members and means whereby said innermost threaded member is initially projected and carries with it another of said threaded members, and means operable upon continued movement of the innermost threaded member when projected to a predetermined point to thereafter project another of said threaded members relative to said innermost member and means for limiting the projection of said other threaded member and for preventing its rotation with respect to said extension.

24. A jack comprising a hollow base having a vertical extension open at its top, a plurality of threaded telescoping members projectable and retractable from and into said extension, a screw device mounted within the base, means to operate the screw device to project and retract said members, the innermost of said threaded members having connection solely with the screw device and with another of said threaded members and means whereby the innermost of said threaded members is initially projected and bodily carries with it one of the remainder of said threaded members during the operation of the screw device, and means including a device separate from the screw device and operable by movement of said innermost member when projected to a predetermined point to thereafter project the remainder of the threaded members relative to said innermost member, and means for limiting the projection of the outermost of said threaded members with respect to said extension.

25. A jack comprising a hollow base having a vertical extension open at its top, three telescoping members projectable and retractable from and into said extension, two of said members being threaded, a screw device mounted within the base for projecting and retracting said members, said innermost and intermediate members being lifting members, said innermost member alone having connection with the screw device, and means whereby the innermost threaded member is initially projected by said device and carries with it the other threaded member, co-operating stops on said device and the innermost member whereby movement of the innermost threaded member when projected to a predetermined point will thereafter project the other threaded member and means for limiting the projection of the other threaded member with respect to said extension.

MILLARD B. LUCKER.